United States Patent [19]

Shigetomi

[11] 4,284,726
[45] Aug. 18, 1981

[54] COMPOSITE ANION ADSORBENT AND METHOD FOR MAKING SAME

[76] Inventor: Yasumasa Shigetomi, 5-32, 2-chome, Tsushima-Minami, Okayama, Japan

[21] Appl. No.: 38,702

[22] Filed: May 14, 1979

[30] Foreign Application Priority Data

May 13, 1978 [JP] Japan .................. 53-056904

[51] Int. Cl.$^3$ .................. B01J 41/12; C08K 3/22
[52] U.S. Cl. .................. 521/28; 521/25; 260/29.6 M
[58] Field of Search .............. 521/28, 25; 260/29.6 M

[56] References Cited

U.S. PATENT DOCUMENTS

| | | | |
|---|---|---|---|
| 2,373,632 | 4/1965 | Meyers et al. .................. | 521/28 |
| 2,506,537 | 5/1950 | Barnes et al. .................. | 260/29.6 M |
| 3,306,870 | 2/1967 | Eilers et al. .................. | 260/29.6 M |
| 3,590,011 | 6/1971 | Grachev et al. .................. | 521/25 |
| 3,941,730 | 3/1976 | Lalenberger .................. | 260/17.4 ST |
| 4,102,842 | 7/1978 | Fujimoto et al. .................. | 260/29.6 B |

*Primary Examiner*—Joseph L. Schofer
*Assistant Examiner*—Peter F. Kulkosky
*Attorney, Agent, or Firm*—Koda and Androlia

[57] ABSTRACT

A composite anion adsorbent which includes a dehydration cured composite gel of an organic hydrophilic polymer and a metal hydroxide. In the preferred embodiment, the metal hydroxide is a hydroxide such as iron hydroxide, aluminum hydroxide, titanium hydroxide, manganese hydroxide, tin hydroxide and zirconium hydroxide and oxides which form hydroxides in aqueous solutions.

4 Claims, No Drawings

COMPOSITE ANION ADSORBENT AND METHOD FOR MAKING SAME

BACKGROUND OF THE INVENTION

1. Field of the Invention

This invention relates to adsorbent materials and more particularly to adsorbents which adsorb anions and vapor.

2. Prior Art

Composite adsorbents containing inorganic adsorbents made from hydroxides of iron, aluminum, etc. in an organic polymer gel are primarily useful as cation adsorbents and their anion adsorptivity is very low. It has been generally known for some time that metal hydroxides selectively adsorb heavy metal ions, well, but little was known about anion adsorbtion. It has been reported that iron hydroxide has the ability to coprecipitate the anions of phosphoric acid, arsenic acid, etc., but these are accounts of active adsorptivity.

SUMMARY OF THE INVENTION

Accordingly it is the generaly object of the present invention to provide an adsorbent which adsorbs anions.

It is another object of the present invention to provide an adsorbent which adsorbs vapors.

In keeping with the principles of the present invention, the objects are accomplished by a unique composite anion adsorbent. The composite anion adsorbent includes a dehydration cured composite gel of an organic hydrophilic polymer and a metal hydroxide. The metal hydroxide is a hydroxide such as iron hydroxide, aluminum hydroxide, titanium hydroxide, manganese hydroxide, tin hydroxide and zirconium hydroxide.

DETAILED DESCRIPTION OF THE INVENTION

The organic polymer gel used in the present invention is a porous gel made from comparatively hydrophilic organic polymers and can hold a wide range from several percent to several tens of percent, normally 5 to 80%, of water or organic solvent. For example, formalin-crosslinked polyacrylamide gel is an excellent gel which can hold up to 80% of its weight in water. Other gels resembling polyacrylamide gel are hydrophilic polymers such as polyacrylic acid, polyvinyl alcohol, etc. which have been modified by the formation of a crosslinked construction, polyvinylformal, urea-formadlehyde resin, formalin-crosslinked dibenzalsorbitol, etc.

The inorganic adsorbents are optimally metal hydroxides or those which form hydroxides in aqueous solution such as iron hydroxide, hydrated iron oxide, aluminum hydroxide, hydrated aluminum oxide, titanium hydroxide, hydrated titanium oxide, titanic acid, manganese hydroxide, hydrated manganese oxide, tin hydroxide, stannic acid, zirconium hydroxide, hydrated zirconium oxide, etc.

Among the methods of preparing a composite gel, the method of forming a gel by crosslink polymerization of acrylamide in an aqueous solution of a metal salt or an aqueous solution of a metal hydroxide, or the method of forming a gel after dispersing a metal hydroxide in an aqueous solution of polyacrylamide are well known in the prior art and are both simple. In the case where polyvinyl alcohol is used as a base, the gel may be formed by adding boric acid or borax to a dispersion of the metal hydroxide in polyvinyl alcohol solution, or the gel is formed by causing the formal reaction.

The composite adsorbent made from the polymer gel containing metal hydroxide formed in such a way has exceptional adsorptivity for the cations $Li^+$, $Be^{2+}$, $B^{3+}$, $UO_2^+$, $La^{3+}$, $Sr^{2+}$, $Cd^{2+}$, $Zn^{2+}$, $Ni^{2+}$, $Cu^{2+}$, $Hg^{2+}$, $Cr^{3+}$, etc. Since such a composite gel adsorbs $UO_2^+$ well, such a gel is effective for the recovery of uranium.

Furthermore, the adsorptivity for anions such as $CrO_4^{2-}$ exist, but the value is not very large. However, if the composite gel is heat-cured at 50° to 100° C. or the composite gel is dehydration cured by standing for a long time at room temperature or sun drying, the anion adsorptivity and cation adsorptivity reverse, and the anion adsorptivity increases while the cation adsorptivity decreases. Furthermore, materials such as selenous acid, chromic acid, antimonic acid, phosphoric acid, arsenic acid, vanadic acid, ruthenic acid, etc. are selectively absorbed.

The phenomenon of the cation adsorptivity decreasing while the anion adsorptivity increases as a result of dehydration curing is not as yet explainable in terms of a mechanism but this change in adsorptivity is remarkable. For example, the change in adsorptivity for $UO_2^+$ as a cation and $PO_4^{3-}$ as an anion of a composite gel containing iron hydroxide in a formalin-crosslinked polyacrylamide gel created by heat curing as dehydration curing is given in Table 1.

TABLE 1

| Heat curing conditions | Adsorbed cation $UO_2^+$ (meq/ml) | Adsorbed anion $PO_4^{3-}$ (meq/ml) |
|---|---|---|
| 50° C. 0 hours (untreated) | 0.03 | 0.27 |
| 50° C. 14 hours | 0.02 | 0.66 |
| 50° C. 64 hours | 0.01 | 0.72 |
| 90° C. 14 hours | 0.01 | 0.79 |
| 90° C. 64 hours | 0.01 | 0.91 |

It is clear from the results of Table 1 that the anion adsorptivity selectively increases by heat curing and a good composite anion adsorbent is created.

The manufacturer and properties of composite anion adsorbents containing metal hydroxide in various organic polymer gels will be explained in the following detailed examples.

EXAMPLES

1. Adsorbent A (Fe)

100 g of acrylamide and 50 g of formalin are provided in 500 ml of 1 M aqueous iron chloride. 10 g of ammonium persulfate is added to the solution as a polymerization initiator and the solution is neutralized with sodium hydroxide solution. At this point, adsorbent A is formed into a gel by the heat of neutralization created.

2. Adsorbent B (Al)

50 g of finely powdered calcium silicate, 200 ml of 0.1 N hydrochloric acid, 50 g of aluminum chloride, 20 g of formalin and 50 g of water-soluble acrylamide-acrylic acid polymer are combined together and heated. After the mixture has gelled, the aluminum chloride is neutralized by ammonium hydroxide to form the gel adsorbent B.

3. Adsorbent C (Zr,Cr)

To 100 ml of a 10% aqueous solution of polyvinyl alcohol (PVA) of average degree of polymerization 1700 and degree of saponification of 99% was added to 5 ml of 10% aqueous sodium sulfite and 2 ml of 2% cuprous sulfate. To this was added 10 ml of 5% aqueous sodium chromate solution and then 8 ml of zirconium hydroxide solution is added and mixed. After about one minute adsorbent C is created as a light elastic gel.

4. Adsorbent D (Sn)

150 g of tin hydroxide is dispersion peptized in 500 ml of 0.1 M hydrochloric acid. To this added 50 g of formalin and 100 g of urea. 0.5 g of amonia persulfate is then added as a polymerization initiator and the total mixture is agitated at 40° C. The gel formed is pulverized in an alkali solution to create the adsorbent D.

5. Adsorbent E (Ti)

50 g of hydrated titanium oxide prepared from titanium sulfate is dispersed in 250 ml of water. 125 ml of 20% dibenzalsorbitol solution, 125 ml of 15% polyvinyl alcohol solution and 30 g of formalin are then added. The solution is then heated to 90° and gelled to give the adsorbent E.

6. Adsorbent F (Mn)

100 g of polyvinyl alcohol, 50 g of formalin and 150 g of manganese sulfate are placed in a beaker and dissolved in 500 ml of water. The solution is then radiation gelled by exposure to ultraviolet light (wavelength 200–300 m$\mu$) to create adsorbent F.

The anion adsorptivity of adsorbents A–F prepared as described above have been compared for adsorption in an as is state, after 50 hours of heat curing at 100° C. and after dehydration and drying by being exposed to the heat and the light of the sun. The anion adsorptivity test conditions were: 1 ml of the adsorbent was added to 100 ml of 200 ppm aqueous solution (pH 7, held at 25° C.), agitated for 5 hours, and the amount adsorbed measured.

From the tests Table 2 is created. As shown in FIG. 2, the efficacy of dry curing is clearly confirmed. A similar confirmation of effectiveness is obtained for the situation where the gel is dehydrated and dryed by being exposed to the heat and light of the sun and the increase in alkalai, resistance, as measured by the degree of swelling, for such an adsorbent is clear from the results of Table 3. Furthermore, if the dehydration treatment of heat curing the gel for 50 hours or dehydration and drying by exposure to the heat and light of the sun are sufficiently carried out, the shrinkage of the adsorbent is at least 10% and the final density becomes 0.86 g/cm$^3$.

TABLE 3

Relation Between the Degree of Alkali Swelling* and the Number of Days of Dehydration Drying of the Adsorbent

| Room Temperature Drying (Days) | Degree of Swelling (%) | Sun-drying (Days) | Degree of Swelling (%) |
|---|---|---|---|
| 0 | 150 | 0 | 150 |
| 1 | 150 | 1 | 50 |
| 3 | 120 | 2 | 20 |
| 15 | 80 | 3 | 10 |
| 25 | 30 | 5 | 5 |
| 30 | 20 | 7 | 0 |

*The degree of swelling of the adsorbent after soaking for one day in 5M sodium hydroxide solution.

The results of the measurements of the vapor capacity of the adsorbent A are shown in Table 4. From the results shown in Table 4, it is clear that the composite adsorbent possesses adsorptivity for acetylacetone, ether, ammonia, and ethanol. Furthermore, if the composite adsorbent is placed in a column in powdered form, it can be expected that it will be useful as an air filter for specific gases.

TABLE 4

Weight of Vapor Retained by Adsorbent A*

| | Vapor Composition | | | |
|---|---|---|---|---|
| Carrier | Acetyl-acetone | Ether | Ammonia | Ethanol |
| Fe (112 mg/ml) | 10 | 17 | | |
| Co(II) (118 mg/ml) | | | 30 | 23 |
| Mn + V** (110mg/ml) (22mg/ml) | | | 23 | |

*The adsorption retention weight is the weight % of vapor with respect to 100g of adsorbent.
**Adsorbent (V + Mn) is a coprecipitate of maganese (III) hydroxide and vanadium. Ammonium chloride is added to this and the adsorbent formed after heat treatment.

The composite anion adsorbent of the present invention includes an inorganic adsorbent supported by an organic polymer gel in the same way as previously proposed cation adsorbents; however, the characteristics of the adsorbent is changed by dry curing treatment by light, heat or exposure. In addition, in this case, even if the metal hydroxide is supported by gel after being dried, the anion adsorption is not very marked; but if it is dried while being supported by the polymer, the anion adsorptivity increases remarkably. As the anion adsorptivity is increased by such a simple procedure

TABLE 2

Adsorption Volume (meq/ml) for Various Anions

| Adsorbent | Polymer gel monomer or polymer | Carrier cross-linking agent | Carrier* | $AsO_4^{3-}$ a | b | $PO_4^{3-}$ a | b | $S\theta O_4^{2-}$ a | b | $CrO_4^{2-}$ a | b | $VO_3^-$ a | b | Citric Acid a | b | Alkylbenzene sulfonic acid a | b |
|---|---|---|---|---|---|---|---|---|---|---|---|---|---|---|---|---|---|
| A | Acrylamide | Formalin | Fe (2M) (112mg/ml) | 0.28 | 0.81 | 0.27 | 0.91 | 0.10 | 0.22 | | | 0.11 | 0.31 | 0.30 | 0.93 | | |
| B | Acrylic Acid | Formalin | Al (2M) (54mg/ml) | 0.25 | 0.75 | 0.25 | 0.87 | | | | | | | | | 0.002 | 0.009 |
| C | PVA | Cr | ZR (2M) (182mg/ml) | 0.55 | 0.75 | | | | | 0.66 | 0.88 | | | | | | |
| D | Urea | Formalin | Sn (2M) (237mg/ml) | 0.21 | 0.23 | 0.23 | 0.26 | | | | | | | | | | |
| E | Dibenzal Sorbitol + PVA | Formalin | Ti (2M) (86mg/ml) | 0.02 | 0.06 | 0.03 | 0.90 | | | | | | | | | | |
| F | PVA | Formalin | Mn (2M) (110mg/ml) | 0.13 | 0.5 | | | | | | | | | | | | |

*a: before heating, b: after heating
Adsorbent A had a cation adsorptivity for Hg, Zn, and U of 0.007, 0.05, and 0.03 meq/ml before heating, and 0.001, 0.02, and 0.01 meq/ml after heating and the handling is both simple and cheap, it is possible to supply products of high utility as polution preventing materials for industrial anion or vapor adsorption by means of the present invention.

It should be apparent to those skilled in the art that the above described embodiments and examples are but a few of the many possible specific embodiments and examples which represent the applications of the principles of the present invention. Numerous and varied other embodiments and examples can be devised by those skilled in the art without departing from the spirit and scope of the invention.

I claim:

1. A method for producing a composite anion adsorbent comprising the steps of:
preparing organic hydrophilic polymer gel using a compound selected from the group consisting of formalin-crosslinked polyacrylamide, formalin-crosslinked polyvinyl alcohol, metal-crosslinked polyvinyl alcohol, urea-formaldehyde, and formalin-crosslinked dibenzalsorbitol;
mixing into the organic hydrophilic polymer gel an inorganic adsorbent or combination thereof selected from the group consisting of iron hydroxide, hydrated iron oxide, aluminum hydroxide, hydrated aluminum oxide, titanium hydroxide, hydrated titanium oxide, titanic acid, manganese hydroxide, hydrated manganese oxide, tin hydroxide, stannic acid, zirconium hydroxide, hydrated zirconium oxide; and
dehydrating the mixture thus prepared under 50°–100° C.

2. A method for producing a composite anion adsorbent according to claim 1, wherein said organic hydrophilic polymer is prepared by polymerizing acrylamide with formalin in aqueous iron chloride together with a polymerzation initiator.

3. A method for producing a composite anion adsorbent according to claim 2, wherein said inorganic adsorbent is a combination of iron hydroxide and hydrated iron oxide.

4. A method for producing a composite anion adsorbent according to claim 3, further comprising the step of neutralizing the mixture.

* * * * *